(12) United States Patent
Morecki et al.

(10) Patent No.: US 8,924,711 B2
(45) Date of Patent: Dec. 30, 2014

(54) HACK-DETERRING SYSTEM FOR STORING SENSITIVE DATA RECORDS

(75) Inventors: Ronen Morecki, Raanana (IL); Oren Levy, Raanana (IL)

(73) Assignee: Zooz Mobile Ltd., Kfar Saba (IL)

( * ) Notice: Subject to any disclaimer, the term of this patent is extended or adjusted under 35 U.S.C. 154(b) by 326 days.

(21) Appl. No.: 13/482,036

(22) Filed: May 29, 2012

(65) Prior Publication Data

US 2013/0268752 A1 Oct. 10, 2013

Related U.S. Application Data

(60) Provisional application No. 61/619,947, filed on Apr. 4, 2012.

(51) Int. Cl.
*H04L 29/06* (2006.01)
*G06F 21/00* (2013.01)

(52) U.S. Cl.
CPC ......... *H04L 63/0428* (2013.01); *H04L 2209/80* (2013.01)
USPC ...................................................... 713/155

(58) Field of Classification Search
CPC ............ H04L 63/0428; H04L 2209/80; H04L 2209/56; H04L 9/08; H04L 9/32
USPC ...................................................... 713/155
See application file for complete search history.

(56) References Cited

U.S. PATENT DOCUMENTS

| | | | |
|---|---|---|---|
| 6,105,131 A | 8/2000 | Carroll | |
| 6,317,829 B1 | 11/2001 | Van Oorschot | |
| 6,612,488 B2 | 9/2003 | Suzuki | |
| 7,430,540 B1* | 9/2008 | Asani | 705/41 |
| 8,639,928 B2* | 1/2014 | Bursell | 713/168 |
| 2001/0037264 A1 | 11/2001 | Husemann et al. | |
| 2002/0049818 A1* | 4/2002 | Gilhuly et al. | 709/206 |
| 2003/0037264 A1* | 2/2003 | Ezaki et al. | 713/202 |
| 2003/0112977 A1* | 6/2003 | Ray et al. | 380/270 |
| 2003/0140235 A1* | 7/2003 | Immega et al. | 713/186 |
| 2005/0210289 A1* | 9/2005 | Brown et al. | 713/201 |
| 2006/0126850 A1 | 6/2006 | Dawson et al. | |
| 2006/0131390 A1 | 6/2006 | Kim | |
| 2007/0162760 A1 | 7/2007 | Samuelsson et al. | |

(Continued)

FOREIGN PATENT DOCUMENTS

| | | |
|---|---|---|
| EP | 1223495 A1 | 7/2002 |
| EP | 1921578 A1 | 5/2008 |

(Continued)

OTHER PUBLICATIONS http://en.wikipedia.org/wiki/Key_management.

(Continued)

*Primary Examiner* — Lisa Lewis
(74) *Attorney, Agent, or Firm* — Harness, Dickey & Pierce, PLC

(57) ABSTRACT

A mobile communication system comprising a multiplicity of mobile devices, and a server communicating with the mobile devices via a communication network, and a central database which is in data communication with the server and which is operative for storing sensitive data encrypted using at least one key, at least a portion of which is provided, only on certain occasions, by an individual one of the mobile devices and is not retained between the occasions by the central database.

30 Claims, 8 Drawing Sheets

(56) References Cited

U.S. PATENT DOCUMENTS

| | | |
|---|---|---|
| 2007/0297610 A1* | 12/2007 | Chen et al. .................... 380/270 |
| 2008/0091614 A1 | 4/2008 | Bas Bayod et al. |
| 2008/0108324 A1 | 5/2008 | Moshir et al. |
| 2009/0075630 A1* | 3/2009 | McLean ........................ 455/411 |
| 2009/0192913 A1 | 7/2009 | Saito et al. |
| 2011/0016323 A1 | 1/2011 | Fascenda |
| 2012/0110100 A1* | 5/2012 | Hiramatsu .................... 709/206 |
| 2012/0136798 A1* | 5/2012 | Navar et al. ..................... 705/71 |
| 2014/0122885 A1* | 5/2014 | Wu et al. ....................... 713/171 |

FOREIGN PATENT DOCUMENTS

| | | | | |
|---|---|---|---|---|
| EP | 1968265 A1 * | 9/2008 | ............. | H04L 12/58 |
| KR | 20040066769 A | 7/2004 | | |
| TW | 522319 B | 3/2003 | | |
| WO | 98/34203 A1 | 8/1998 | | |
| WO | 00/31699 A1 | 6/2000 | | |
| WO | 02/41271 A1 | 5/2002 | | |
| WO | 02/054210 A1 | 7/2002 | | |
| WO | 03/065318 A2 | 8/2003 | | |
| WO | 2005/024743 A1 | 3/2005 | | |
| WO | 2007/114826 A1 | 10/2007 | | |
| WO | WO 2006107542 A3 * | 11/2007 | | |
| WO | 2010/093770 A2 | 8/2010 | | |
| WO | 2012/014231 A1 | 2/2012 | | |

OTHER PUBLICATIONS http://www.windowsecurity.com/articles/encryption-key-management.html.

Mitchell et al; Key Storage in Secure Networks; Elsevier, 1988, p. 215-228; http://www.sciencedirect.com/science/article/pii/0166218X88900686.

http://en.wikipedia.org/wiki/Replay_attack.

http://msdn.microsoft.com/en-us/library/aa738652.aspx.

http://www.pcmag.com/encyclopedia$_b$_term/0,2542,t=replay+attack&i=50439,00.asp.

http://en.wikipedia.org/wiki/Brute-force_attack.

http://pymnts.com/commentary/Credit-Card-Security-Breach-Is-the-Industiy-Focused-on-the-Right-Security-Issues/.

International search report dated Jul. 18, 2013.

* cited by examiner

HACK-DETERRING SYSTEM FOR STORING SENSITIVE DATA RECORDS

REFERENCE TO CO-PENDING APPLICATIONS

Priority is claimed from U.S. Ser. No. 61/619,947, entitled "Hack Deterring System For Storing Sensitive Data Records" and filed 4 Apr. 2012.

FIELD OF THE INVENTION

The present invention relates generally to encoded computerized data bases and more particularly to encoded computerized centralized data bases serving a population of users.

BACKGROUND OF THE INVENTION

Cryptographic key management is a known field.

U.S. Pat. No. 6,105,131 describes a secure server for a distributed information system, with "personal volts".

U.S. Pat. No. 6,317,829 describes a public key cryptography based system which stores decryption private key history data in a directory accessible by roaming users. A system stores, per user, security data such as decryption private key history data which serves as master copy data. A public repository stores remotely accessible per user decryption private key history data stored in the security management server. A computing device communicates with the public repository unit to obtain the decryption private key history data and decrypts encrypted data with portable security.

A White Paper posted on Internet by cloudKey +1Touch Security v1.01: Jul. 25, 2011 presents the following in connection with thieves which "can survey the herd of companies storing millions of credit card numbers": "if Sony, et al, stopped storing your credit card information in the cloud, the problem would be solved. It really is that simple. But, from Sony, et al's, perspective, how will they make it easier for you to pay for stuff? The financial fall-out of repeated re-entry of credit card information would be catastrophic from a sales perspective. People would stop buying online. Amazon's 1Click patent and their sole licensee Apple have shown the dramatic increase in online sales conversion when the buy decision is reduced to a single click . . . cloudKey's "distributed key" topology turns the numbers game against the thieves by keeping the data they seek (private credit card information) on each user's device, not in an online central database "bank". The data is stored in an extremely secure encrypted form (256 bit Triple DES), but the keys to the encrypted data are stored in a secured online database. So to steal your private data, the thief would have to physically steal your phone, then guess your password, and even if they did all that, they wouldn't get your credit card data, just the ability to make some purchases that get sent to your house. Definitely not worth their effort.

. . . If you have a gym locker you wouldn't write your combination numbers on the locker door right? Keeping a decryption key on the same device you have sensitive information is tantamount to the same thing . . . . Keeping the encryption keys in the cloud is the right solution here. It forces a would-be thief to break into two places in order to steal any one piece of information—both the device AND the cloud."

The disclosures of all publications and patent documents mentioned in the specification, and of the publications and patent documents cited therein directly or indirectly, are hereby incorporated by reference.

SUMMARY OF THE INVENTION

In accordance with an aspect of the presently disclosed subject matter, there is provided a mobile communication system comprising:

a multiplicity of mobile devices; and a server communicating with the mobile devices via a communication network; and a central database which is in data communication with the server and which is operative for storing sensitive data encrypted using at least one key, at least a portion of which is provided, only on certain occasions, by an individual one of the mobile devices and is not retained between the occasions by the central database.

In accordance with an embodiment of the presently disclosed subject matter, there is further provided a system wherein the sensitive data is double-encrypted, wherein a second layer of encryption is provided by use of at least one private key known only to the server.

In accordance with an embodiment of the presently disclosed subject matter, there is still further provided a system wherein the at least one private key known only to the server comprises a single key used for all device records.

In accordance with an embodiment of the presently disclosed subject matter, there is still further provided a system wherein the sensitive data comprises a multiplicity of device-specific data records each respectively including an ID identifying a respective one of the multiplicity of mobile devices.

In accordance with an embodiment of the presently disclosed subject matter, there is still further provided a system wherein each individual record from among the multiplicity of device-specific data records is protected with a key at least a portion of which is provided, on occasion, by an individual one of the mobile devices identified by the ID included in the individual record.

In accordance with an embodiment of the presently disclosed subject matter, there is still further provided a system wherein at least a portion of the key is stored aboard the individual one of the mobile devices.

In accordance with an embodiment of the presently disclosed subject matter, there is still further provided a system wherein at least a portion of at least one key is never stored in any permanent storage medium in the central database.

In accordance with an embodiment of the presently disclosed subject matter, there is still further provided a system wherein at least a portion of at least one key is erased from memory of the server, soon after being used by the server subsequent to having been provided, by the individual one of the mobile devices, to the server.

In accordance with an embodiment of the presently disclosed subject matter, there is still further provided a system wherein at least a portion of the key is stored on the server in the clear, only while a single specific key-based operation is performed after which at least a portion of the key is cleared from memory by the server.

In accordance with an embodiment of the presently disclosed subject matter, there is still further provided a system wherein the single specific key-based operation comprises registration of sensitive particulars e.g. characterizing or associated with a mobile device or bearer thereof e.g. credit card particulars.

In accordance with an embodiment of the presently disclosed subject matter, there is still further provided a system wherein the single specific key-based operation comprises effecting payment to a single vendor for a single device-vendor transaction.

In accordance with an embodiment of the presently disclosed subject matter, there is still further provided a system wherein at least a portion of the key undergoes encryption before it is provided to the server by an individual one of the mobile devices, and undergoes decryption thereafter, using a per-device network key which is created by the server and stored in the database and in the device.

In accordance with an embodiment of the presently disclosed subject matter, there is still further provided a system wherein each key, provided by an individual one of the multiplicity of mobile devices, thereby to define a multiplicity of device-specific keys, undergoes encryption before it is provided to the server, and undergoes decryption thereafter, using a network key specific to the individual one of the multiplicity of mobile devices, whose network key is created by the server and stored in the database, thereby to define a multiplicity of network keys.

In accordance with an embodiment of the presently disclosed subject matter, there is still further provided a system wherein at least a portion of the key is stored on the mobile device's key store and is managed by the device's OS (operating system).

In accordance with an embodiment of the presently disclosed subject matter, there is still further provided a system wherein the key is created by the device.

In accordance with an aspect of the presently disclosed subject matter, there is still further provided a computerized method for retaining sensitive computer data regarding each of a multiplicity of mobile devices communicating with a computer server via a communication network, the method comprising:

storing sensitive computer data encrypted using at least one cryptographic key ("device key"), in a central computer database which is in data communication with the server; and accepting at least a portion of the key, only on certain occasions, from an individual one of the mobile devices rather than retaining the portion in the central database between the occasions.

In accordance with an embodiment of the presently disclosed subject matter, there is still further provided a method comprising using a first network key set to encrypt the communication between server and each device.

In accordance with an embodiment of the presently disclosed subject matter, there is still further provided a method wherein the storing comprises:

at each device, encrypting both sensitive personal data associated with the device, and the device key using the first network key set, thereby to generate encrypted information, and sending the encrypted information to the server together with device's ID;

at server, decrypting the encrypted information thereby to yield sensitive data and device key;

at server, double-encrypting the sensitive data with the device key and with a server key comprising a private key that is known to the server, thereby to yield double-encrypted data; and storing the double encrypted data in the database, under device's ID, and discarding the device key.

In accordance with an embodiment of the presently disclosed subject matter, there is still further provided a method wherein the first network key set includes one key per device and each key in the first network key set is generated on the server and sent to the key's corresponding mobile device when an individual mobile device first interacts with the server.

In accordance with an embodiment of the presently disclosed subject matter, there is still further provided a method wherein the first network key set includes a public/private key pair and wherein the public key is sent to at least one device using a computerized public distribution protocol.

In accordance with an embodiment of the presently disclosed subject matter, there is still further provided a method comprising using a second network key set to encrypt communication between the server and a clearing house.

In accordance with an embodiment of the presently disclosed subject matter, in which the server shown and described herein functions inter alia as a client of a clearing house server performing clearing house functionalities, there is still further provided a method wherein the second network key set 2 includes one key per clearing house and each key in the second network key set is generated on the clearing house server and sent to the key's corresponding server when a the server first interacts with the clearing house. In accordance with an embodiment of the presently disclosed subject matter, there is still further provided a method wherein the second network key set includes a public/private key pair and wherein the public key is sent to at least one from the clearing house using a computerized public distribution protocol.

In accordance with an embodiment of the presently disclosed subject matter, there is still further provided a method wherein the server verifies validity of the sensitive data with a data clearing house before discarding the device key.

In accordance with an embodiment of the presently disclosed subject matter, there is still further provided a method wherein the storing comprises:

at each device, double-encrypting sensitive data associated with the device, first with the device key and then with the first network key set, thereby to generate double-encrypted information, and sending the double-encrypted information to the server with device ID but without device key;

at server, decrypting one layer of said double-encrypted information thereby to yield sensitive data encrypted using the device key;

at server, storing the sensitive data encrypted using the device key, under device's ID, in the database.

In accordance with an embodiment of the presently disclosed subject matter, there is still further provided a method wherein the sensitive data comprises credit card data.

In accordance with an embodiment of the presently disclosed subject matter, there is still further provided a method comprising:

at server, accepting from a device, a payment call including its own (device's) ID, plus device key encrypted using first network key set;

at server, decrypting the device key, using the first network key set;

at server, pulling double encrypted data corresponding to the ID included in the payment call, from the database and decrypting the double encrypted data using the device key and server key and discarding the device key.

In accordance with an embodiment of the presently disclosed subject matter, there is still further provided a method comprising sending the data as decrypted from the server to a clearing house, encrypted only with a second network key set.

In accordance with an embodiment of the presently disclosed subject matter, there is still further provided a method wherein the sensitive computer data is encrypted using only one encryption performed with a single key formed by combining the device key and a server key known only to the server, such that successful encryption depends both on knowledge private to the device and on knowledge private to the server.

In accordance with an embodiment of the presently disclosed subject matter, there is still further provided a method wherein the sensitive data comprises credit card data.

In accordance with an aspect of the presently disclosed subject matter, there is still further provided a computer program product, comprising a non-transitory computer usable medium having a computer readable program code embodied therein, the computer readable program code adapted to be executed to implement a method for retaining sensitive computer data regarding each of a multiplicity of mobile devices communicating with a computer server via a communication network, the method comprising:

storing sensitive computer data encrypted using at least one cryptographic key ("device key"), in a central computer database which is in data communication with the server; and accepting at least a portion of the key, only on certain occasions, from an individual one of the mobile devices rather than retaining said portion in the central database between the occasions.

Certain embodiments of the present invention seek to provide a hack-deterring system for storing sensitive data records for separate occasional use.

Certain embodiments of the present invention seek to provide a system wherein the device is authenticated with the server and is also involved in encryption of server data such that at least some data in the server is unreadable without the device.

Certain embodiments of the present invention seek to provide an anti-hacking system comprising storing a key in a mobile device, sending the key from the mobile device to a database (including any repository for computerized e.g. digital data) for utilization in the course of executing a transaction originated by the mobile device, and, upon finalization of the transaction, deleting the key from the database.

Certain embodiments of the present invention seek to provide a method for securing an end user's particulars such as but not limited to personal credit card information, on secure servers while allowing the end user to interact with her or his mobile communication device in order to employ the credit card particulars. The term "device" or "remote device" or "mobile device" as used herein is intended to include but not be limited to any of the following: mobile telephone, smart phone, playstation, iPad, TV, remote desktop computer, game console, tablet, mobile e.g. laptop or other computer terminal, embedded remote unit.

Certain embodiments of the present invention seek to provide a system and method for securing sensitive data specific to each of a population of remote typically mobile devices, at a (or more than one) storage location/s other than aboard the remote devices themselves which typically are not considered secure enough to store their own sensitive data. The remote devices communicate via a suitable communication network, e.g. a wireless such as cellular communication network or any other Internet network, with a server. The storage location/s is typically secured using conventional methods and may be co-located with the central server. Typically, the data specific to each device is encrypted using a key ("device key") which is not stored at the storage location and instead is provided by the device to the server and/or storage location only when the key needs to be used by the server and/or storage location. The device key may for example be stored aboard the device.

Certain embodiments of the present invention seek to provide a system and method wherein keys securing mobile-device specific information need not be replaced as frequently as in conventional systems, to provide set-backs for hackers, as a separate key is provided for each device. Typically, the separate device key is not stored anywhere in the server/database environment, or is stored in that environment for such a short time, that at any given time, only a very small number of device keys, or only a very small proportion of the total number of keys, is stored in the server/database environment. For example, typically, the database may include tens or hundreds of thousands, or millions, of device records, however, at any given time, only 10% or 1% or 0.1% or 0.01% of these may be present in the server/database environment. To give another example, at any given time, less than 500 or less than 100 or less than 50 or less than 20 or less than 10 device keys may be present in the server/database environment.

Thereby, hacking motivation is significantly reduced, since cracking a key yields access to one (or perhaps a few) record/s only, and not to an entire database holding an entire large population of mobile-device specific records. It is appreciated that cracking keys by a brute force attack, for example, may require months of operation of a strong CPU, depending of course on key length, for each record and each key.

Typically, key storage is accessible only responsive to provision of an administrator's password.

Certain embodiments of the present invention seek to provide a 3 layer encryption scheme, employing at least some of the following keys:

a. a Private (known only to specific parties e.g. only to the device itself) symmetric or asymmetric key ("device key") (for encryption and decryption) that is unique for each device. Typically, the private key is stored on the device's secured storage e.g. on the Device Key Store provided by the operating system (OS).

b. a Network shared symmetric or asymmetric key ("network key" for encrypting and decrypting the data that is passed between the device and the server, preventing man-in-the-middle attacks and eavesdropping. This layer may use standard SSL public key encryption or, e.g. for higher security, a per-device symmetric key may be employed.

c. Private symmetric key that is known only to the server. There is typically one key which is used for all device records. This "server key" is stored somewhere on the server, e.g. in the server's file system. In conventional systems this may be the only key used, with no device key layer.

Certain embodiments of the present invention seek to provide an anti-hacking system for storing sensitive data including at least some of the following components: a server storing a server key which may be retained on a local hard disk or connected external device e.g. usb; an sql (say) database storing, per device: (a) data encrypted with device, server keys & (b) network key; mobile devices each storing network and device keys; and a third party e.g. clearing house, all interconnected via a suitable network such as but not limited to a computer network.

Certain embodiments of the present invention seek to provide an anti-hacking system in which at least a portion of at least one cryptographic key is erased from the server and/or the server's connected environment, soon after being used by the server subsequent to having been provided, by a mobile device, to the server. Erasure may occur one or a few milliseconds after completion, or less, or one or a few hundredths of a second, or one or a few tenths of a seconds, or one or a few seconds, or one or a few minutes. Typically, at any point of time no more than 1% or 0.5% or 0.1% or 0.05% or 0.01% of the number of keys used by a population of mobile devices served by the system is present in its entirety in the server and/or the server's connected environment. Optionally, a portion each of a large number of keys is present in the server's connected environment, but such portions do not respectively enable the entire key to be reconstructed.

In credit card securing applications, the server may employ the decrypted form of the credit card particulars in the following 2 use cases and typically only in the following 2 use cases:

a. Registering a new credit card typically including verifying the set of the credit card's defining particulars against a 3rd party payment processor.

b. Payment processing in which the credit card is sent to the third party payment processor for making a payment transaction.

For these use cases and typically only for them, the device sends its private key to the server. The private device key is not stored on the server at all times. It is typically stored for little longer or no longer than the time employed to perform the specific operation/s that the key is actually being used for such as registration or payment processing. Decryption using the above-described 3-layer scheme may occur when a mobile device requests a service from a service provider that stores his sensitive data on a remote database. Decryption may include some or all of the following operations in any suitable order e.g. as follows: Mobile device sends the individual/unique key to the server using a secure method; Service requests the mobile device related record from the database; Service decrypts the specific data using the global key and decrypts it again using the individual key; Service request is being served to the mobile device; Service drops and erases the copy of the individual key that was provided by the mobile device.

There is herein provided, in accordance with certain embodiments, a computerized method for registering a new credit card, the method comprising:

encrypting card particulars typed onto a mobile device and a private device key using a network key, thereby to generate an encrypted message, and sending the encrypted message to a server at which the network key is stored;

at the server, decrypting the card particulars and the device key using the network key stored on the server;

sending the card particulars to a computerized $3^{rd}$ party processor for verifying card validity; and at the server, encrypting the card particulars at least with the device private key and storing on a database, and then clearing the device private key from memory.

Further in accordance with certain embodiments of the present invention, sending comprises sending the particulars over a computer network secured by SSL.

Still further in accordance with certain embodiments of the present invention, encrypting comprises double-encrypting using both the device private key and a private key known only to the server.

Also provided, in accordance with certain embodiments of the present invention, is a computerized method for facilitating user payment for a transaction, using credit card particulars stored in a server, the method comprising:

upon activation of a payment application by a user of a mobile device, using the device to encrypt at least a Private Key and payment authorization information, using a network key stored on the device, thereby to generate encrypted information and sending the encrypted information to the server;

at the server, decrypting the payment authorization information and private key using the network key and loading a relevant encrypted credit card record from a database;

decrypting the encrypted credit card record using at least the private key, thereby to obtain an in-the-clear credit card record; and sending credit card record information derivable from the in-the-clear credit card record to a 3rd party processor and removing the in-the-clear credit card number and device key from memory.

Further in accordance with certain embodiments of the present invention, the credit card record information derivable from the in-the-clear credit card record comprises the in-the-clear credit card record itself.

Still further in accordance with certain embodiments of the present invention, credit card record information derivable from the in-the-clear credit card record comprises the in-the-clear credit card record secured by SSL.

Additionally in accordance with certain embodiments of the present invention, the payment authorization information comprises an authorization value which is verified for transaction validity.

The network may for example comprise a cellular network.

The server and the centralized database may be co-located.

The key may be created by the server upon device registration.

Some or each of the keys may comprise an AES 256 bit key.

Each network key may comprise an asymmetric or symmetric key.

The server key e.g. at least one private key known only to the server may comprise a symmetric key.

The database may comprise a relational database e.g. an SQL relational database.

At least one key used herein may comprise a private symmetric key.

Also provided is a computer program comprising computer program code means for performing any of the methods shown and described herein when said program is run on a computer; and a computer program product, comprising a typically non-transitory computer-usable or -readable medium or computer readable storage medium, typically tangible, having a computer readable program code embodied therein, said computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a typically non-transitory computer readable storage medium.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein, such as but not limited to steps of flowcharts, may be performed by a conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer or processor. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may where-ever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor may be employed to compute or generate information as described herein e.g. by providing one or more modules in the processor to perform functionalities described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

For example, the system shown and described herein may be implemented as a web-based system including software, computers, routers and telecommunications equipment.

BRIEF DESCRIPTION OF THE DRAWINGS

Certain embodiments of the present invention are illustrated in the following drawings.

Computational components described and illustrated herein can be implemented in various forms, for example, as hardware circuits such as but not limited to custom VLSI circuits or gate arrays or programmable hardware devices such as but not limited to FPGAs, or as software program code stored on at least one intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Data can be stored on one or more intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

Figure 1:
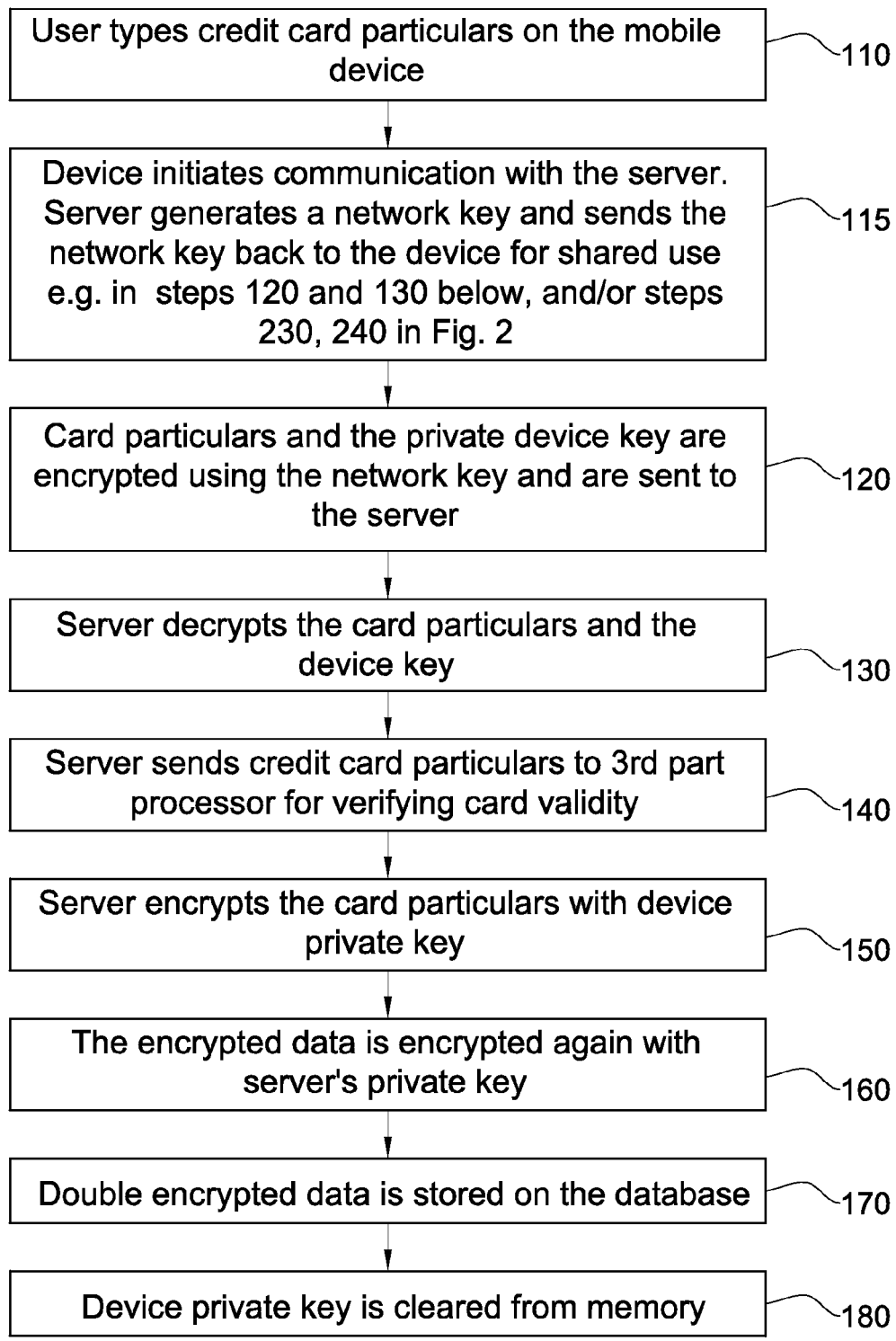
FIG. 1 is a simplified flowchart illustration of a computerized method for registering a new credit card in which typically, a device initiates a communication with the server and the network key is exchanged (one time only per device), operative in accordance with certain embodiments of the present invention.
Figure 2:
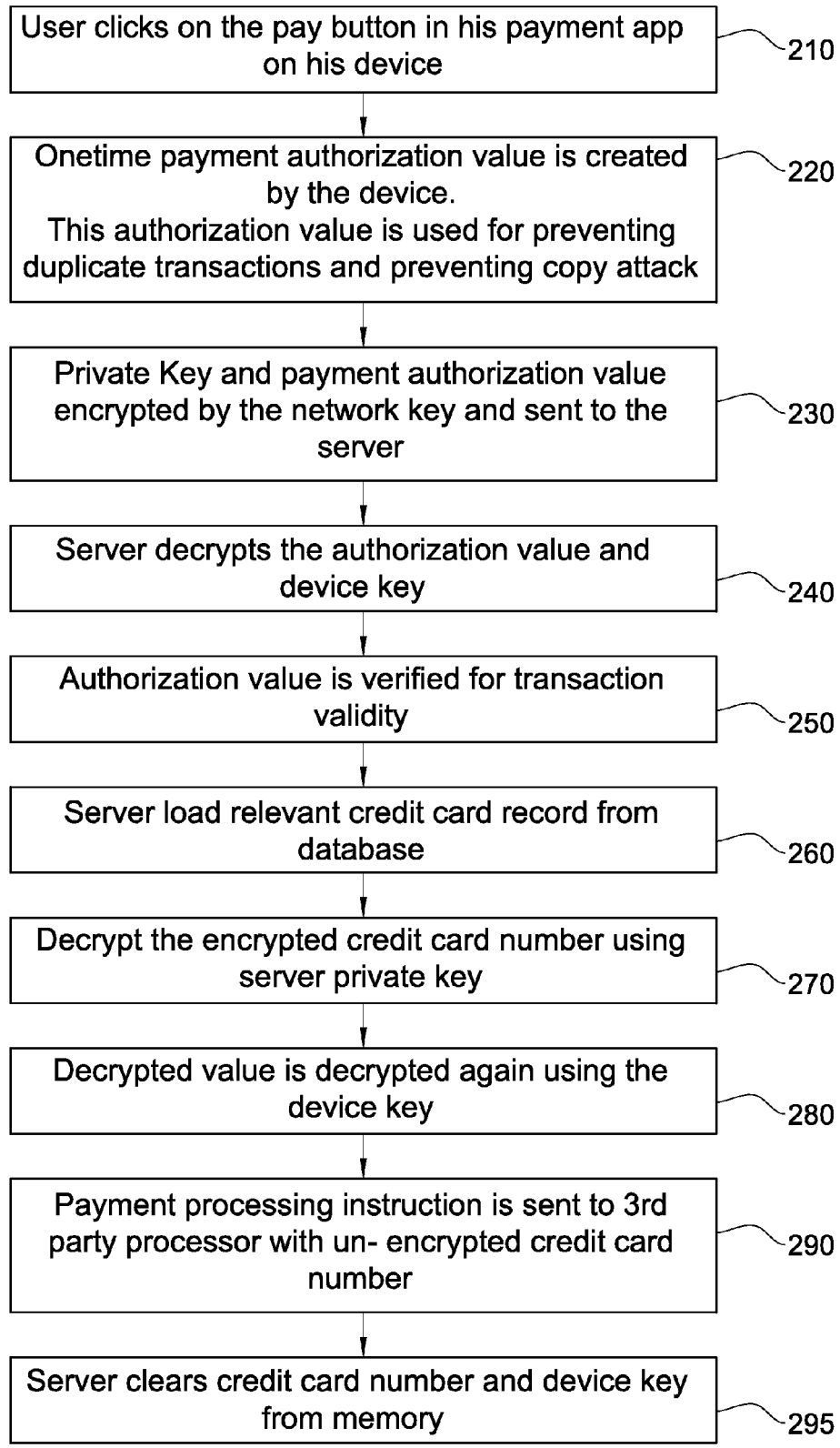
FIG. 2 is a simplified flowchart illustration of a computerized method for facilitating user payment for a transaction, using credit card particulars stored in the server using the method of FIG. 1, which is operative in accordance with certain embodiments of the present invention.
Figure 3:
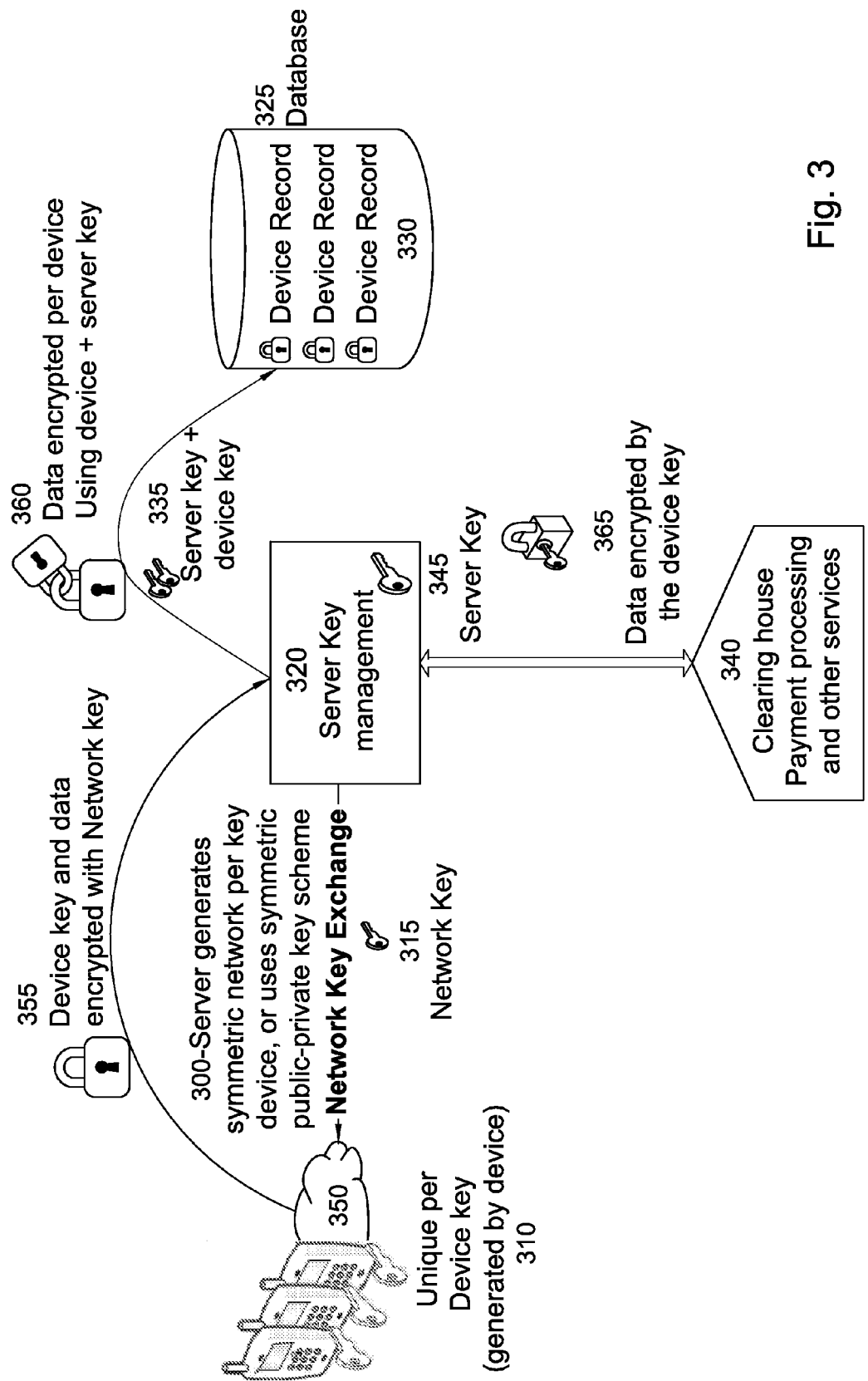
FIG. 3 is a simplified block diagram illustration of an anti-hacking system for storing sensitive data, which is operative in accordance with certain embodiments of the present invention.

Referring now to FIGS. 1-3, a system and methods useful in association therewith are described in which a decryption key or one portion thereof resides on a mobile remote device and is used by a central server, storing sensitive data that is private per mobile device, upon request by the mobile device. The full decryption key is generally not available to the server at times in which the mobile device is not requesting any service from the server. No single key is stored that decrypts an entire stored collection of keys, and even the key to a specific record stored at the server is typically distributed over mobile devices or between the server and individual mobile devices. The applicability of certain embodiments of the invention includes mobile services in which, typically, sensitive data is accessed only when a mobile device requests it.

FIG. 1 is a simplified flowchart illustration of a computerized method for registering a new credit card. FIG. 2 is a simplified flowchart illustration of a computerized method for facilitating user payment for a transaction, using credit card particulars stored in the server using the method of FIG. 1. FIG. 3 is a simplified block diagram illustration of an anti-hacking system for storing sensitive data.

Typically a 3 layer encryption scheme is employed, employing the following keys:

A server key typically comprises a private symmetric key that is known only to the server. There is typically a single key which is used for all device records. This key may be used to encrypt sensitive data in the server. Thereby, even if a 3$^{rd}$ party e.g. hacker obtains access to several mobile devices' keys, this key ensures that the hacker cannot decrypt the data.

The server key may be created and stored in the server's storage or loaded into memory from the removable storage device on the server load. The key may for example be stored on local storage, disconnected storage like a USB storage device, remote computer, internal memory or any other method which is difficult to access by external third parties. Disconnected storage (in which the storage it not accessible to the server via any communication network) is particularly useful if a hacker has compromised the server and obtained access thereto, since the server key is then not to be found anywhere.

A network key typically comprises a private symmetric that is known only to, e.g. stored by both of, the server and the device/s whose data is encoded using that key. The key is typically unique for each device or for each of a subset of the population of devices. The network key may be created by the server and stored in the Database per device. The key is typically passed to the device only once, e.g. when the device first registers to the server. The keys may be passed over the Internet on the SSL encryption layer when the device communicates with the server. It is appreciated that the SSL itself constitutes a network security layer and the network key is typically an additional encryption added to that security layer.

It is appreciated that SSL is public-key based, such that if what to be encrypted is known, any device can effect the encryption, using the known public key. Therefore, the additional private network encryption provided by the network key is advantageous because a hacker's device cannot pretend to be the device it is targeting since the hacker's device does not hold the targeted device's network key. Example: If a network key is not provided, and it is desired to encrypt an email address over the network using the email address owner's private device key, then the following attack may occur: A hacker device can pretend to be the email address owner and encrypt the email address owner's email address with the hacker device's own different private key. The server may think the hacker's device is the email address owner's device and may use the hacker's device's private key to encrypt the email address owner's details.

The network key is operative for encrypting and decrypting the data that is passed between the device and the server, preventing man-in-the-middle attacks and eavesdropping. Alternatively, the network key may comprise a public key with asymmetric encryption.

A device private key is stored on local storage of the device preferably on the device keystore, managed by the device OS (operating system). The key is created either by the device or by the server upon device registration, but it is not stored on the server hence is only known to the server for the duration of those relatively rare occasions when the server is actually called upon to use this key.

All of the encryption keys and algorithms may for example be standard 3DES or AES 256 or 128 bit keys. Asymmetric keys may for example be standard 1024 or 2048 bit keys. Any suitable method may be used to create keys such as keys available in development platforms such as but not limited to Java's javax.crypto.KeyGenerator, or iOS's CommonCrypro (SecKeyWrapper).

The Database may comprise a standard SQL relational DB (database) such as but not limited to MySQL, Oracle DB, Microsoft SQL Server, Sybase. Typically, each credit card comprises a separate record stored in a separate row in the Database. The scheme for credit card particular retention, e.g. as per FIG. 2, step 260, may have any or all of the above characteristics:

Card number encrypted as described herein.
The card security code e.g. CVV is not stored, only verified on registration
Last 4 digits of credit card number may be stored unencrypted
Expiration date may be stored unencrypted
Card vendor type (Visa, AMEX, MC, etc. . . . ) may be stored unencrypted. Typically, the device's shared network private key which is used to encrypt the network traffic according to certain embodiments of the present invention e.g. as per steps 230, 240 in FIG. 2, is also stored in this record.

Reference is now made again to FIG. 1 which is a simplified flowchart illustration of a computerized method for registering a new credit card. The method of FIG. 1 typically comprises some or all of the following steps, suitably ordered e.g. as shown:

Step 110: User types credit card particulars on the mobile device.

Step 115: Mobile device initiates communication with the server. Server generates a network key and sends the network key back to the device for shared use e.g. in steps 120 and 130 below, and/or steps 230, 240 in FIG. 2.

Step 120: Card particulars and the private device key are encrypted using the network key and sent to the server. According to certain embodiments, CVV, Last 4 digits and expiration date are not encrypted when in storage (standard server security being relied upon) but are encrypted as they travel over the network to prevent eavesdropping. These details are typically stored unencrypted since they may be used for record management and identification such that the server might legitimately employ them even when there is no communication with the device.

Step 130: Server decrypts the card particulars and the device key using the network key stored on the server.

Step 140: Server sends credit card particulars to a 3$^{rd}$ party processor e.g. a clearing house such as (in Israel) that residing at the following www link: shva.co.il, or such as "authorize.net" in the USA, for verifying card validity. Typically, the particulars are sent over a computer network such as the Internet, suitably secured e.g. by SSL.

Step 150: Server encrypts the card particulars with device private key.

Step 160: The encrypted data is encrypted again with server's private key. Instead of using two encryptions, only one encryption may be performed with a single key formed by combining the device private key and the server key (e.g. by concatenating both keys to one long key). Thereby, successful encryption depends on knowledge of two elements, one from the device and another that is private to the server.

Step 170: Double encrypted data is stored on the database.

Step 180: Device private key is cleared from memory as soon as possible after completing step 150, such as but not limited to one or a few milliseconds after completion, or less, or one or a few hundredths of a second, or one or a few tenths of a seconds, or one or a few seconds, or one or a few minutes, or even an order of magnitude of an hour after completion.

The device private key may be cleared from memory before the server begins the next session with another user.

c. it is cleared such that no more than 50 device keys, or 0.001% of the total number of served device keys, are in memory at any one time, or typically, at any point of time no more than 1% or 0.5% or 0.1% or 0.05% or 0.01% of the number of keys is present in its entirety in memory of the server. Optionally, a portion each of a large number of keys is present, but such portions do not respectively enable the entire key to be reconstructed.

A particular advantage of the method of FIG. 1 is that there is no point in time where the totality of database keys are in one place; on the contrary: typically, only a very small number of records at each point in time have the key available for decrypting. This yields a system unattractive for hackers, since only a small number of records are hackable at any given point in time.

FIG. 2 as described above is a simplified flowchart illustration of a computerized method for facilitating user payment for a transaction, using credit card particulars stored in the server using the method of FIG. 1. The method of FIG. 2 typically comprises some or all of the following steps, suitably ordered e.g. as shown:

Step 210: User of device clicks on the pay button in his payment app on his device.

Step 220: A onetime payment authorization value e.g. onetime password may be created by the device, e.g. using conventional methods.

Step 230: device encrypts its own private key and payment authorization value, using the network key stored on the device, and sends the private device key encrypted information to the server.

Step 240: Server decrypts the authorization value, if provided, and device key e.g. using the shared network key.

Step 250: Authorization value, if provided, may be verified conventionally for transaction validity and/or so as to prevent duplicate transaction, or replay attacks.

Step 260: Server loads relevant credit card record from database,

Step 270: Decrypts the encrypted credit card number using server private key Step 280: Decrypted value is decrypted again using the device key.

Step 290: Payment processing instruction is sent to 3rd party processor e.g. to an automatic clearing house such as "authorize.net", in the USA, or, in Israel, that residing at the following www link: shva.co.il, with unencrypted credit card number (may send via SSL over Internet). It is appreciated that "authorize.net" and shva.co.il are but examples of computerized payment gateways or Payment Processors, or Credit Card Acquirer networks which may be employed as third party processors in steps 140 and 290.

Step 295: Server removes the in-the-clear credit card number and device key from memory soon after completing step 280, e.g. a microsecond or less thereafter.

It is appreciated that the order of steps shown in the drawings need not be as shown. For example, step 150 need not precede step 160 in FIG. 1, and step 270 need not precede step 280 in FIG. 2. Instead, steps. 160 and 280 may respectively precede steps 150 and 270.

It is appreciated that any suitable method/s may or may not be employed, in conjunction with the systems and methods of the present invention, to prevent or ward off various known types of attacks and challenges, such as but not limited to duplicate transactions, copy attacks, replay attacks and brute force attacks, and/or to neutralize or minimize the effect of such attacks. The specific mention above, e.g. in steps 230 and 250, of a specific means (e.g. one-time password) for warding off specific attacks, by attackers who do or do not possess the relevant key, is merely exemplary and may be provided in conjunction with other methods, in isolation, or not at all.

A particular advantage is that any kind of attack that successfully compromises the device and gains access thereto and control of device private keys and other device keys and signatures stored thereupon, does not yet result in access to the sensitive data e.g. credit card information protected according to certain embodiments of the present invention. Thus the attacker may need to attack the server as well—which, even if successful, may allow the attacker access to as little as a single data record e.g. a single credit card record, which makes the entire attack unworthy of the hacker's attentions.

It is appreciated that steps shown e.g. steps 220, 230, 250 in FIG. 2 may be omitted. Also, some steps e.g. step 140 may be performed, if at all, only once—e.g. the first time that a credit card bearer and mobile device holder interacts with the system.

The applicability of certain embodiments of the present invention is not limited to any specific encryption schemes. Any suitable encryption scheme that uses encryption/decryption keys may be employed. Any suitable key length may be employed. Any suitable key generation algorithm may be employed, such as but not limited to 3DES, AES, RC4. DES.

Additional encryption steps and/or additional keys may be employed if desired. Communication between the elements of FIG. 3 e.g. for key transmission, may employ any wired or wireless technology and protocol, preferably secured.

Figure 4:
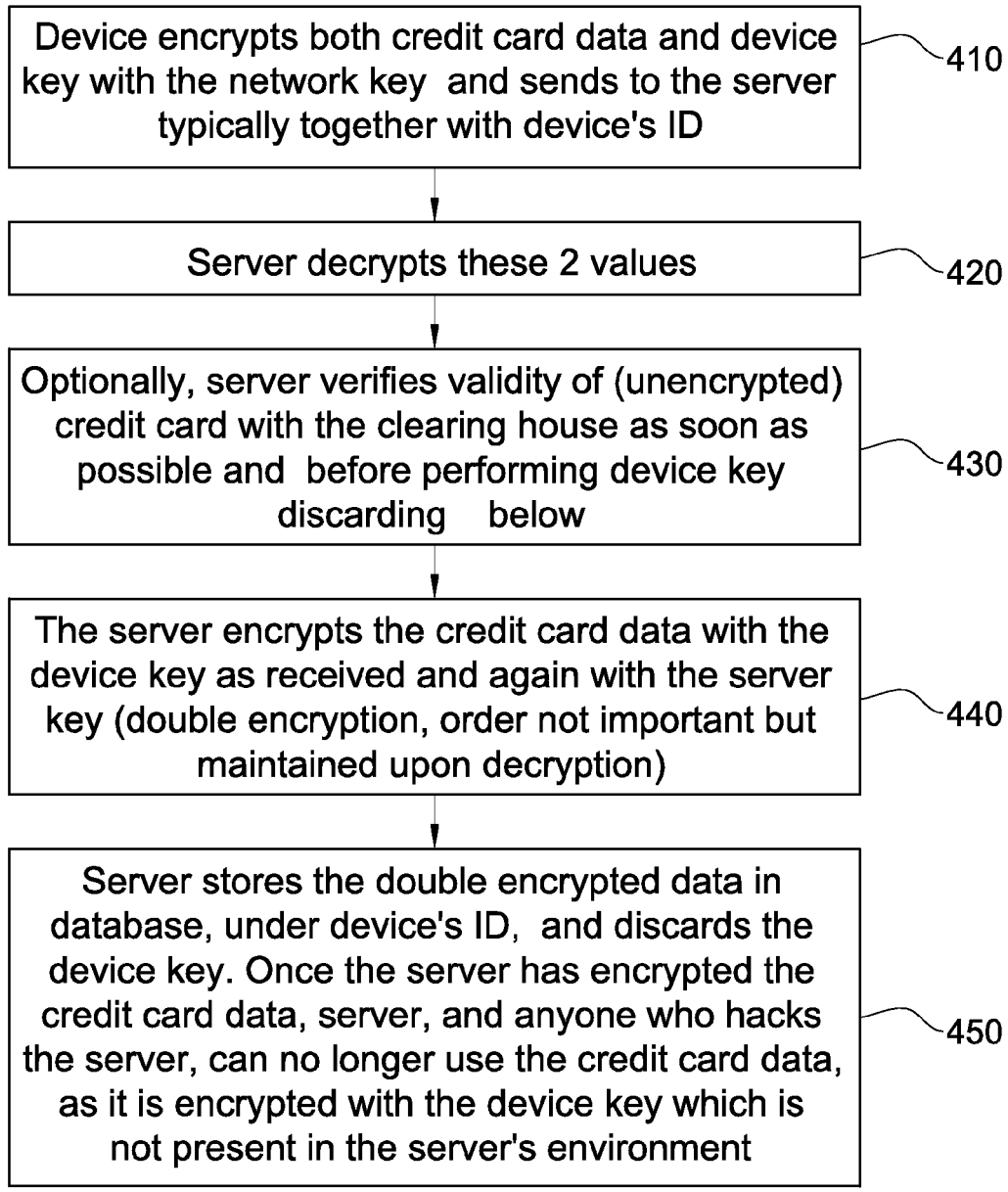
FIG. 4 is a simplified flowchart illustration of a computerized method for key generation for secure storage of sensitive per-device information, which is operative in accordance with one embodiment of the present invention.
Figure 5:
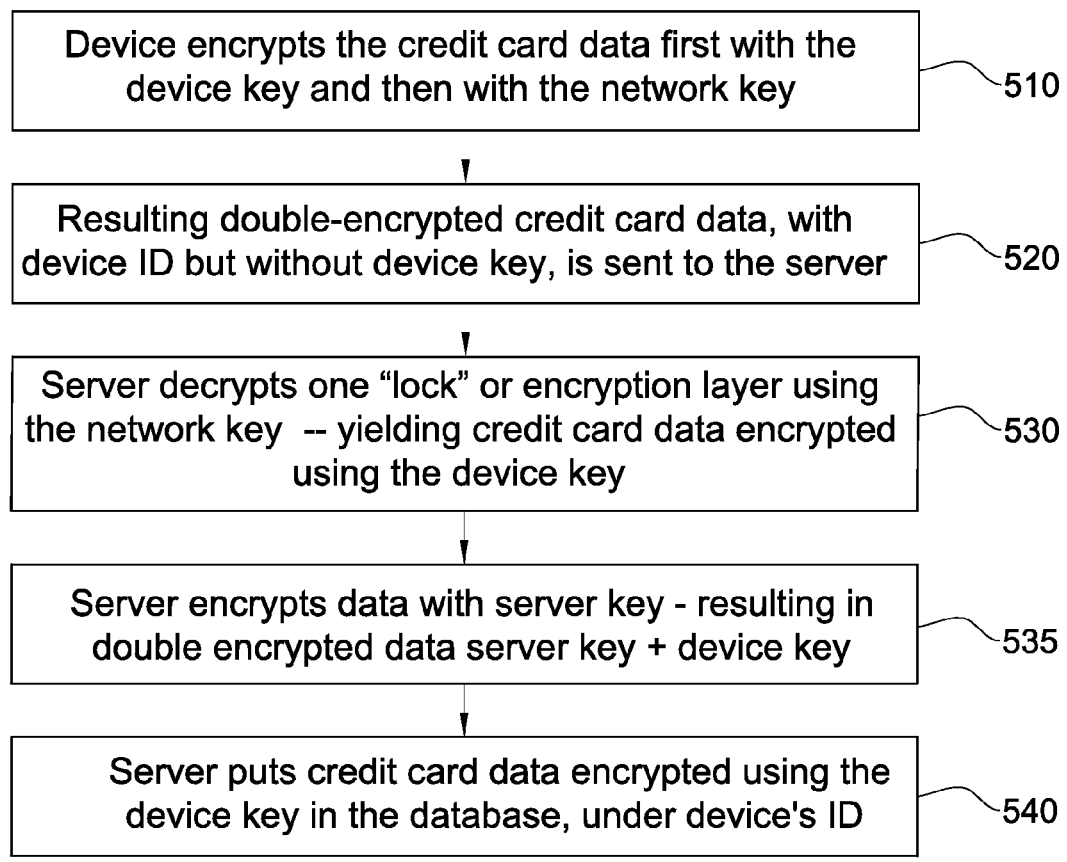
FIG. 5 is a simplified flowchart illustration of a computerized method for key generation for secure storage of sensitive per-device information, which is operative in accordance with another embodiment of the present invention.
Figure 6:
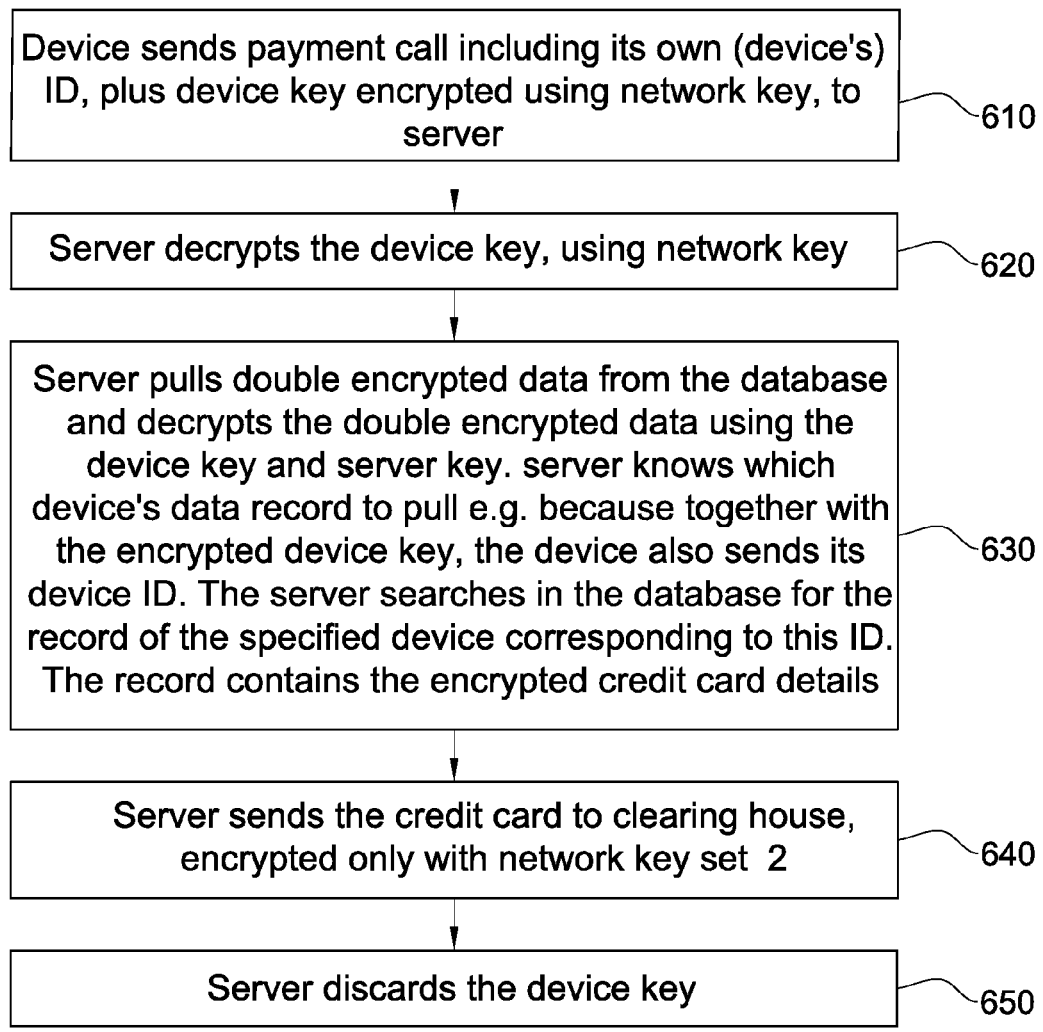
FIG. 6 is a simplified flowchart illustration of a method whereby a device, having participated in a key generation method according to the present invention e.g. as per FIG. 4 or 5, may pay using a credit card stored as per FIG. 4 or 5, which is operative in accordance with certain embodiments of the present invention.

Reference is now made to FIGS. 4-6 which are simplified flowchart illustrations of further embodiments of the present invention. According to these embodiments, as well as certain embodiments described above, some or all of the following keys may be provided:

a. Server key—created once on the server, or supplied from an external private source determined by the system's development team. The server key is a private key that is known only to the server and, according to certain embodiments not to any other entity, or to no entity other than the external private source). For example, the server key may be generated by the server upon first installation and may not be known to external sources. The key typically comprises a binary file or binary data that is either file installed on the server or read into memory from an external device such as but not limited to a USB drive.

b. Device key—generated on the device and stored on the device. May for example be generated when a relevant app embodying the method of the present invention is installed in the mobile device or when the first interaction of the mobile device with the server occurs. This key is known only to the device and is sent to the server only according to need e.g. as defined herein.

c. Network key set 1—key/s used to encrypt the communication between server and each device. According to option a, network key set 1 includes one key per device and each key in Network key set 1 is generated on the server per mobile device the first time an individual mobile device interacts with the server and may be sent to the device on this first interaction. According to option b, a public/private key pair may be used as Network key set 1, in which case a public key, typically common to all devices and not unique per device, is sent to each device by public distribution (e.g. using a standard public distribution protocol, e.g. a protocol sharing some or all characteristics of the SSL protocol and/or server certificate transport protocol, and typically characterized in that the certificate holds the public key.

d. Network key set 2—key/s used for communication between the server and the clearing house. According to option c, network key set 2 includes one key per clearing house and each key in Network key set 2 is generated on the server per clearing house the first time a clearing house interacts with the server and is sent to the clearing house on this first interaction.

According to Option d, a public/private key pair may be used as Network key set 2. A public key, typically common to all clearing houses and not unique per clearing house, is sent to each clearing house by public distribution (e.g. using a standard public distribution protocol such as but not limited toSSL encryption. It is appreciated that typically, no extra layer need be employed and instead, the SSL layer is the network encryption set 2.

Most typically, option d (using public/private key scheme) is employed.

The key generation method of FIG. 4, also termed herein Option 1, is now described; the method may include some or all of the following steps, suitably ordered e.g. as shown:

Step 410: Device encrypts both credit card data and device key with the network key and sends to the server typically together with device's ID Step 420: Server decrypts these 2 values.

Step 430: Optionally, server verifies validity of (unencrypted) credit card with the clearing house as soon as possible and before performing device key discarding step below.

Step 440: The server encrypts the credit card data with the device key as received and again with the server key (double encryption, order not important but maintained upon decryption)

Step 450: Server stores the double encrypted data in database, under device's ID, and discards the device key. Once the server has encrypted the credit card data, Server, and anyone who hacks the server, can no longer use the credit card data, as it is encrypted with the device key which is not present in the server's environment.

The key generation method of FIG. 5, also termed herein Option 2, is now described; the method may include some or all of the following steps, suitably ordered e.g. as shown:

Step 510: Device encrypts the credit card data first with the device key and then with the network key.

Step 520: Resulting double-encrypted credit card data, with device ID but without device key, is sent to the server.

Step 530: Server decrypts one "lock" or encryption layer using the network key—yielding credit card data encrypted using the device key

535: Before putting the data in the DB, the data is typically encrypted again with the server key, so as to be stored double-encrypted

540: Server puts credit card data encrypted using the device key in the Database, under device's ID.

FIG. 6 is a simplified flowchart illustration of a method whereby a device, having participated in a key generation method according to the present invention e.g. as per FIG. 4 or 5, may pay using a credit card stored as per FIG. 4 or 5; the method may include some or all of the following steps, suitably ordered e.g. as shown:

Step 610: Device sends payment call including its own (device's) ID, plus device key encrypted using network key, to server Step 620: Server decrypts the device key, using network key Step 630: Server pulls double encrypted data from the database and decrypts the double encrypted data using the device key and server key. Server knows which device's data record to pull e.g. because together with the encrypted device key, the device also sends its device ID, The server searches in the database for the record of the specified device corresponding to this ID. The record contains the encrypted credit card details.

Step 640: Server sends the credit card to clearing house, encrypted only with network key 2.

Step 650: Server discards the device key.

Option 1 is suitable if it is desired to verify credit card or other sensitive data upon receipt thereof, because according to option 1, the credit card data is initially available to the server in the clear. In contrast, in option 2, Server cannot verify credit card data, since the credit card data or other sensitive data is received encrypted without the key. Option 2 is suitable if it is desired to have a scheme in which the server has the device key in its possession only and solely for a short period e.g. in which payment is executed or other use of sensitive data is made, and at no other time.

According to certain embodiments, key generation options 1 and 2 of FIGS. 4, 5 respectively may each be crossed with any of options a, b, c, d above.

Figure 7:
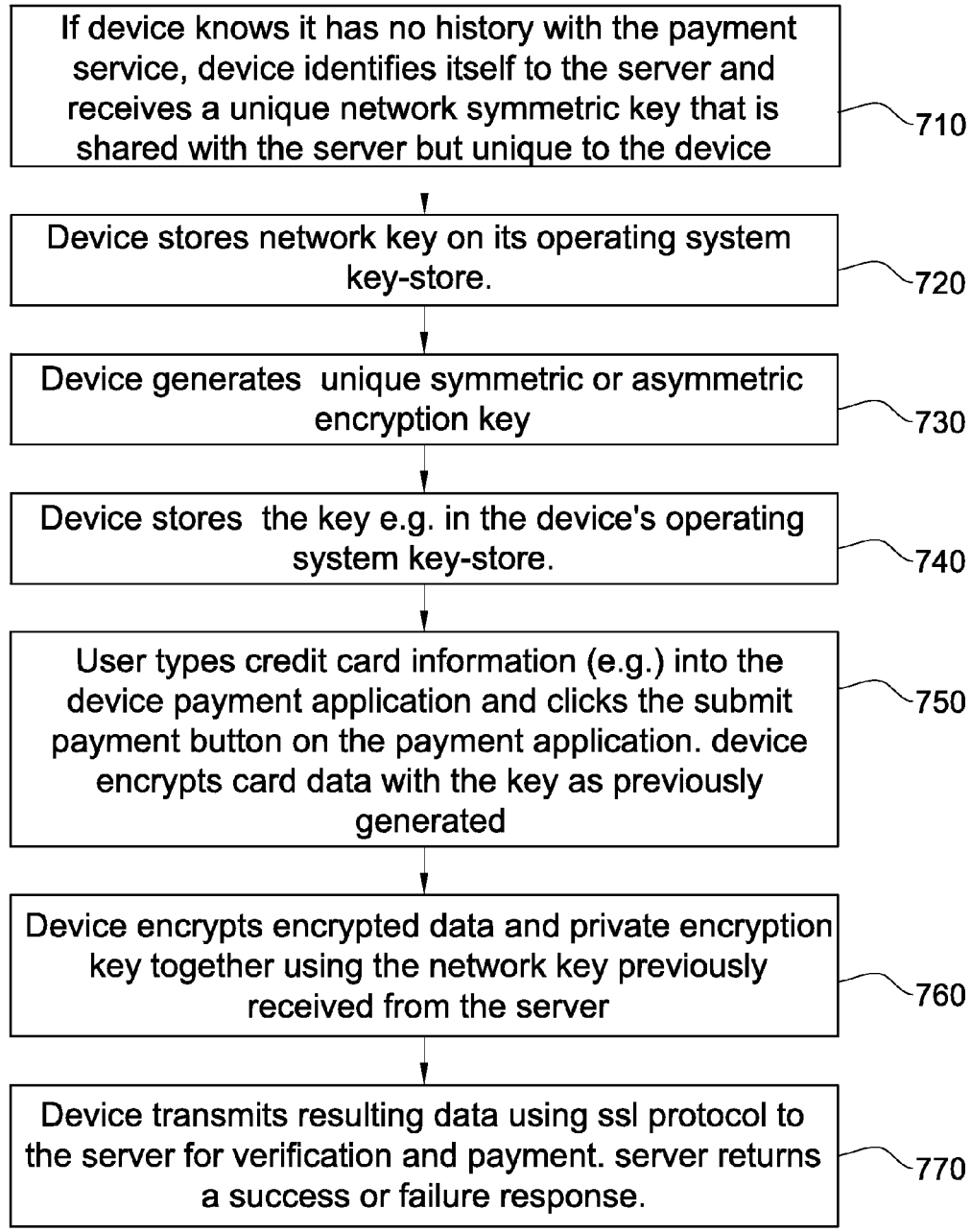
FIG. 7 is a simplified flowchart illustration of a method performed by a device attempting to pay with a credit card for the first time, all operative in accordance with certain embodiments of the present invention.

FIG. 7 is a simplified flowchart illustration of a method performed by a device attempting to pay with a credit card for the first time, all operative in accordance with certain embodiments of the present invention. The method may include some or all of the following steps, suitably ordered e.g. as shown:

Device knows it has no history with the payment service.

Device identifies itself to the server and receives a unique network symmetric key that is shared with the server but is unique to the device.

The network key is stored on the device's operating system key-store.

Device generates unique symmetric or asymmetric encryption key.

Store the key in the device's operating system key-store.

User types credit card information into the device payment application.

User clicks the submit payment button on the payment application.

Card data is encrypted with the previously generated key.

Encrypted data and private encryption key are encrypted together using the network key previously received from the server.

Data is transmitted using SSL protocol to the server for verification and payment.

Server returns a success or failure response.

Figure 8:
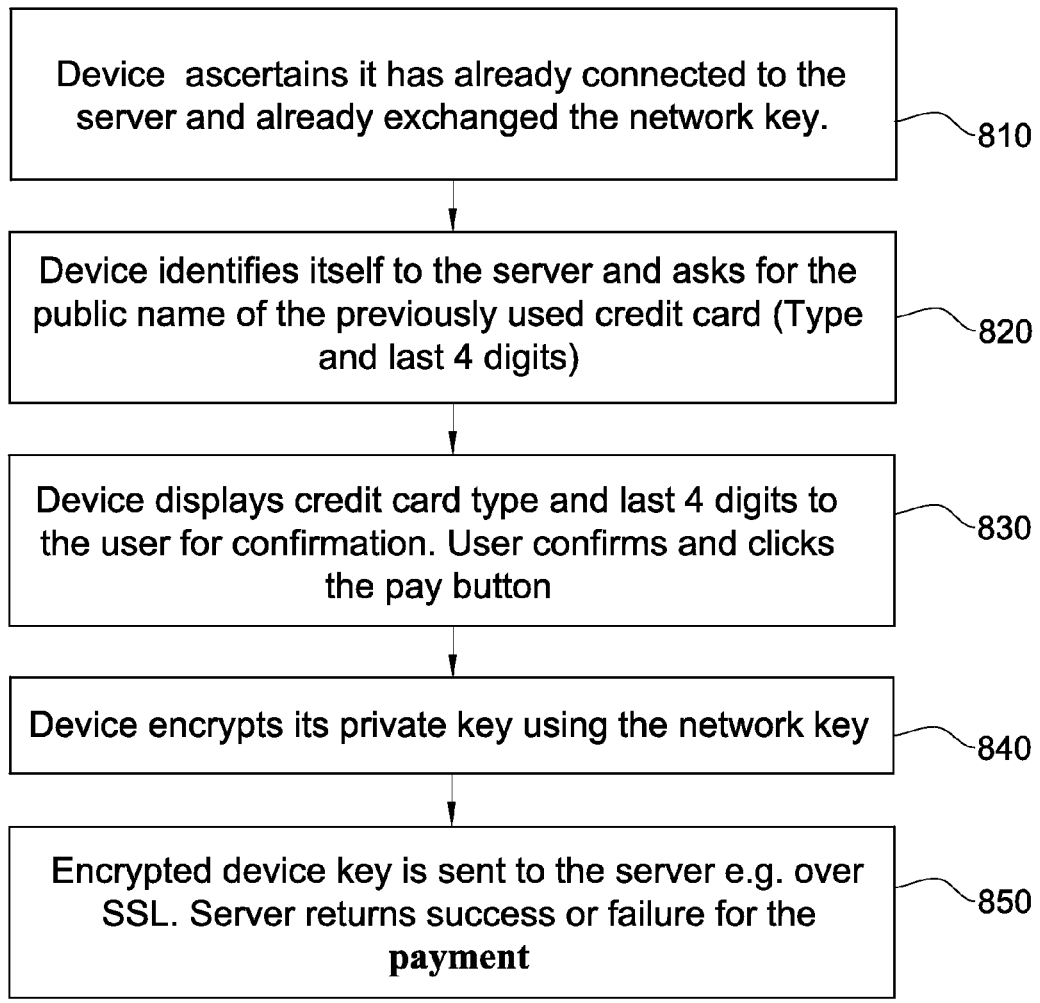
FIG. 8 is a simplified flowchart illustration of a method performed by a device attempting to pay with a credit card for the second (i.e. not first) time, all operative in accordance with certain embodiments of the present invention.

FIG. 8 is a simplified flowchart illustration of a method performed by a device attempting to pay with a credit card for the second (i.e. not first) time, all operative in accordance with certain embodiments of the present invention. The method may include some or all of the following steps, suitably ordered e.g. as shown:

Device knows it is already connected to the server and exchanged the network key.

Device identifies itself to the server and asks for the public name of the previously used credit card (e.g. Type and last 4 digits).

The credit card type and last 4 digits are displayed to the user for confirmation.

User confirms and clicks the pay button.

Device encrypts its private key using the network key.

Encrypted key is sent to the server over SSL.

Server returns success or failure for the payment.

Certain embodiments of the present invention are not limited to specific sensitive data type and data storage and are applicable, for example, to applications in which any or all of the following are to be secured: User credentials such as but not limited to passwords to subscription or other restricted websites, Bank account and access information, personal health records, and signatures such as but not limited to digital signatures or images of written signatures.

Certain embodiments of the present invention are not limited to particular mobile devices, and may serve any mobile device that has the ability to store and send a key in any type of format such as but not limited to any form of byte data that can be stored on a file system, memory, local database, or managed cloud service (e.g. Apple's iCloud).

The system shown and described herein may be implemented in software and added to any application e.g. on platforms such as but not limited to Android, iOS, Blackberry, Windows Phone. Typically, users of the system need not leave the application to which the system is added e.g. by providing a checkout screen, as part of the system, which is a pop-up over the application such that once a transaction is completed, e.g. via a one click checkout process, users are immediately returned to a suitable screen of the application to which the system is added.

A particular advantage of certain embodiments is that even if a mobile device capable of employing credit card particulars is lost or stolen and hacked, the credit card particulars do not become available to the hacker. Typically, the only information which might be pertinent to obtaining credit card particulars and which is stored on the mobile device, is a key which encrypts credit card particulars stored other than on the mobile device. Typically, the user (hence also attacker) can only use the credit card particulars, even if in possession of the private key, if the user or attacker is privy to knowledge ("what you know") not stored on the mobile device e.g. a PIN code required to use a mobile device app which uses credit card particulars to purchase goods or services.

It is appreciated that terminology such as "mandatory", "required", "need" and "must" refer to implementation choices made within the context of a particular implementation or application described here within for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally includes at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. A mobile communication system comprising:
a multiplicity of mobile devices; and
a server communicating with the mobile devices via a communication network; and
a central database which is in data communication with the server and which is operative for storing sensitive data encrypted using at least one device key, at least a portion of which is provided, only on certain occasions, by an individual one of the mobile devices and is not retained between said occasions by the central database,
wherein each device encrypts both the device key and sensitive computer data associated with the device and sends them to the server,
the server decrypts the received information thereby to yield the sensitive computer data associated with the device and the device key,
the server encrypts the sensitive computer data associated with the device with the device key, and
the server stores the encrypted data in the database and discards the device key.

2. A system according to claim 1 wherein the sensitive data is double-encrypted, wherein a second layer of encryption is provided by use of at least one private key known only to the server.

3. A system according to claim 2 wherein said at least one private key known only to the server comprises a single key used for all device records.

4. A system according to claim 1 wherein the sensitive data comprises a multiplicity of device-specific data records each respectively including an ID identifying a respective one of the multiplicity of mobile devices.

5. A system according to claim 4 wherein each individual record from among the multiplicity of device-specific data records is protected with a key at least a portion of which is provided, on occasion, by an individual one of the mobile devices identified by the ID included in the individual record.

6. A system according to claim 5 wherein each key, provided by an individual one of the multiplicity of mobile devices, thereby to define a multiplicity of device-specific keys, undergoes encryption before it is provided to the server, and undergoes decryption thereafter, using a network key specific to said individual one of the multiplicity of mobile devices, whose network key is created by the server and stored in the database, thereby to define a multiplicity of network keys.

7. A system according to claim 1 wherein at least a portion of said key is stored aboard the individual one of the mobile devices.

8. A system according to claim 7 wherein at least a portion of said key is stored on the mobile device's key store and is managed by the device's OS (operating system).

9. A system according to claim 1 wherein at least a portion of at least one key is never stored in any permanent storage medium in the central database.

10. A system according to claim 1 wherein at least a portion of at least one key is erased from memory of the server, soon after being used by the server subsequent to having been provided, by said individual one of the mobile devices, to the server.

11. A system according to claim 1 wherein at least a portion of said key is stored on the server in the clear, only while a single specific key-based operation is performed after which at least a portion of the key is cleared from memory by the server.

12. A system according to claim 11 wherein said single specific key-based operation comprises registration of credit card particulars.

13. A system according to claim 11 wherein said single specific key-based operation comprises effecting payment to a single vendor for a single device-vendor transaction.

14. A system according to claim 1 wherein at least a portion of said key undergoes encryption before it is provided to the server by an individual one of the mobile devices, and undergoes decryption thereafter, using a per-device network key which is created by the server and stored in the database and in the device.

15. A system according to claim 1 wherein the key is created by the device.

16. A computerized method for retaining sensitive computer data regarding each of a multiplicity of mobile devices communicating with a computer server via a communication network, the method comprising:
- storing sensitive computer data encrypted using at least one cryptographic key ("device key"), in a central computer database which is in data communication with the server; and
- accepting at least a portion of the key, only on certain occasions, from an individual one of the mobile devices rather than retaining said portion in the central database between said occasions, wherein said storing comprises:
- at each device, encrypting both sensitive personal data associated with the device, and the device key using the first network key set, thereby to generate encrypted information, and sending said encrypted information to the server together with devices' ID;
- at server, decrypting said encrypted information thereby to yield sensitive personal data and device key;
- at server, double-encrypting the sensitive personal data with the device key and with a server key comprising a private key that is known to the server, thereby to yield double-encrypted data; and
- storing the double-encrypted data in the data base, under device's ID, and discarding the device key.

17. A method according to claim 16 and also comprising using a first Network key set to encrypt the communication between server and each device.

18. A method according to claim 17 wherein said first network key set includes one key per device and each key in the first network key set is generated on the server and sent to the key's corresponding mobile device when an individual mobile device first interacts with the server.

19. A method according to claim 17 wherein said first network key set includes a public/private key pair and wherein the public key is sent to at least one device using a computerized public distribution protocol.

20. A method according to claim 19 wherein said sensitive data comprises credit card data.

21. A method according to claim 16 and also comprising using a second network key set to encrypt communication between the server and a clearing house.

22. A method according to claim 21 and also comprising:
- at server, accepting from a device, a payment call including its own (device's) ID, plus device key encrypted using first network key set;
- at server, decrypting the device key, using the first network key set;
- at server, pulling double encrypted data corresponding to said ID included in the payment call, from the database and decrypting the double encrypted data using the device key and server key and discarding the device key.

23. A method according to claim 21 wherein the second network key set includes one key per clearing house and each key in the second network key set is generated for the server and sent by the key's corresponding clearing house.

24. A method according to claim 23 wherein each key in the second network key set is sent by the key's corresponding clearing house when the clearing house first interacts with the server.

25. A method according to claim 23 wherein said second network key set includes a public/private key pair and wherein the public key is sent to the server by at least one clearing house using a computerized public distribution protocol.

26. A method according to claim 1 wherein the server verifies validity of the sensitive data with a data clearing house before storing the sensitive data and discarding the device key.

27. A method according to claim 1 wherein said sensitive data comprises credit card data.

28. A method according to claim 22 and also comprising sending the data as decrypted from the server to a clearing house, encrypted only with a second network key set.

29. A method according to claim 16 wherein said sensitive computer data is encrypted using only one encryption performed with a single key formed by combining the device key and a server key known only to the server, such that successful encryption depends both on knowledge private to the device and on knowledge private to the server.

30. A computer program product, comprising a non-transitory computer usable medium having a computer readable program code embodied therein, said computer readable program code adapted to be executed to implement a method for retaining sensitive computer data regarding each of a multiplicity of mobile devices communicating with a computer server via a communication network, the method comprising:
- storing sensitive computer data encrypted using at least one cryptographic key ("device key"), in a central computer database which is in data communication with the server; and
- accepting at least a portion of the key, only on certain occasions, from an individual one of the mobile devices rather than retaining said portion in the central database between said occasions,
- wherein each device encrypts both the device key and sensitive computer data associated with the device and sends them to the server,
- the server decrypts the received information thereby to yield the sensitive computer data associated with the device and the device key,
- the server encrypts the sensitive computer data associated with the device with the device key, and
- the server stores the encrypted data in the database and discards the device key.

* * * * *